(12) United States Patent
Mangelsen et al.

(10) Patent No.: US 8,567,278 B2
(45) Date of Patent: Oct. 29, 2013

(54) ZERO BACKLASH PRELOAD GEARS

(75) Inventors: Jan Christian Mangelsen, Charlotte, IA (US); Richard Dean Rohret, Bettendorf, IA (US); Christopher J. Schilb, Bettendorf, IA (US)

(73) Assignee: Genesis Systems Group, LLC, Davenport, IA (US)

( * ) Notice: Subject to any disclaimer, the term of this patent is extended or adjusted under 35 U.S.C. 154(b) by 874 days.

(21) Appl. No.: 12/495,935

(22) Filed: Jul. 1, 2009

(65) Prior Publication Data

US 2011/0000329 A1    Jan. 6, 2011

(51) Int. Cl.
*F16H 55/18*    (2006.01)
(52) U.S. Cl.
USPC .............................................. 74/409; 74/440
(58) Field of Classification Search
USPC ........................... 74/409, 440, 410, 395–399
See application file for complete search history.

(56) References Cited

U.S. PATENT DOCUMENTS

| | | | |
|---|---|---|---|
| 2,810,299 A | 10/1957 | Partridge | |
| 3,405,580 A | 10/1968 | Hallden | |
| 3,502,059 A | 3/1970 | Davis et al. | |
| 3,657,940 A | 4/1972 | Wagner | |
| 4,261,198 A | 4/1981 | Moore | |
| 4,471,666 A * | 9/1984 | Unrath et al. | 74/61 |
| 4,827,786 A * | 5/1989 | Bailey | 74/409 |
| 5,083,070 A | 1/1992 | Poupard et al. | |
| 5,357,858 A | 10/1994 | Guaraldi et al. | |
| 5,490,433 A * | 2/1996 | Althen | 74/348 |
| 5,685,197 A * | 11/1997 | Baker et al. | 74/409 |

* cited by examiner

*Primary Examiner* — David M Fenstermacher
*Assistant Examiner* — Terence Boes
(74) *Attorney, Agent, or Firm* — McKee, Voorhees & Sease, P.L.C.

(57) ABSTRACT

Described in this application is a zero-backlash preload gear assembly. The assembly is specifically described for use with a positioning system in order to significantly reduce or eliminate mechanical error and improve tolerances. Furthermore, the assembly allows for infinite positioning of a work surface in order to facilitate improved efficiency of an automated system.

10 Claims, 9 Drawing Sheets

ZERO BACKLASH PRELOAD GEARS

FIELD OF THE INVENTION

The present invention relates to positioning apparatus and methods and mechanisms to eliminate or substantially reduce backlash in gearing control systems in a positioning apparatus.

BACKGROUND OF THE INVENTION

Automated servo-driven robots are increasingly becoming a staple in manufacturing settings. From welding to assembly, these machines are capable of performing repetitive tasks with relatively low per-unit expenses. In order to achieve the optimum quality work from such a robot, materials must be positioned at proper positions with only minor variation, defined as manufacturing tolerances.

It is common practice to mount material onto a circular platform having one or more indexed positions. This allows a worker to position materials on one station while the robot is performing the selected operation, for example welding. By providing hard stops between the platform and base to which the table is mounted, the indexed positions can be placed within the appropriate tolerance for the robot to provide function. However, the "hard stop" setup allows only two indexed positions. For more complicated processes requiring several stations, multiple tables must be set up, increasing expense.

Applicant's previous patent, U.S. Pat. No. 5,704,601 to Mangelsen et al., issued Jan. 6, 1998, herein incorporated by reference in its entirety, provided a fluid pressure-actuated cylinder acting as the actuating member, which allowed swift acceleration and deceleration of the rotating table, thereby avoiding jarring the parts or causing damage as the stops are contacted.

According to another patent, U.S. Pat. No. 6,375,178 to Schilb et al. issued Apr. 23, 2002, herein incorporated by reference in its entirety, dual cylinders may be used to avoid the null points identified in the '601 patent, as well as provide two positions by selectively pressurizing the cylinders to engage hard stops. The dual cylinder design also allows the system to be slowed before impacting the hard stops, thereby avoiding jarring of parts.

Therefore, there is a need in the art for a low-cost, high-reliability and accurate positioning system which is rotatable and provides infinitely variable positions without additional costs for each position.

There is also realized in the art a need for a low-cost, high-reliability, and accurate positioning system coupled with a robot which minimizes floor space while maintaining full use of the automated robot.

There is further realized in the art a need for a positioning system with infinite variability while maintaining a high degree of accuracy and predictability.

These problems are sought to be overcome in the present invention.

BRIEF SUMMARY OF THE INVENTION

According to one embodiment, the invention relates to an infinitely variable positioning system with a center-mounted welding robot. The positioning system is preferably driven by a servo motor which translates force through a drive gear to a driven gear connected to the table. Positioned adjacent the drive and driven gear are idler gears which eliminate backlash, thereby ensuring accuracy and reliability of the system without necessitating increased per-position expense or secondary positioning apparatuses, such as hard stops or braking mechanisms. The idler gears are positioned on slots allowing them to move radially about the drive and driven gears, thereby ensuring constant engagement with the drive and driven gears. The driven gear is preferably a hollow gear, allowing electronic equipment to be passed through the rotating gear. Such an arrangement allows the robotic welder to be positioned in the center of the workspace, thereby allowing full range of operation of the robot while reducing floor space requirements.

Described is a gear set comprising a pair of idler gears meshing with a drive and driven gear. The idler gears reduce backlash or lost motion in the gear set by engaging in an interference with the drive and driven gears and are held in position with an adjustment member.

DETAILED DESCRIPTION OF THE PREFERRED EMBODIMENT

The zero-backlash preload gear assembly and positioning device 10 will now be described in detail according to the preferred embodiment with reference to the attached figures where numerals relate to their like in the following description.

The terms "leading edge" and "trailing edge" of the teeth of a gear will be used within this description. The term "leading edge" and "trailing edge" are intended to indicate the faces of an individual gear tooth. Each term is described with reference to the direction of movement of the gear; for example if a gear is being rotated in a clockwise direction, then the "leading edge" is the clockwise-ward face of the gear tooth, while the counter-clockwise (also known as "contra-clockwise", "anticlockwise", or abbreviated "CCW") face of the gear tooth represents the "trailing edge." In the case of gear interaction, force will always be transferred from the "leading edge" of a tooth on a drive gear to the "trailing edge" of a tooth on a driven gear (the terms "drive gear" and "driven gear" in this circumstance are used generically and without reference to the specific structure as described below).

The term "lost motion" may also be used to describe certain aspects of the invention. This term means, within the context of two or more meshing gears, movement of a drive gear without corresponding movement of a driven gear. Such an occurrence is caused by the teeth of a drive gear being smaller than the tooth gap on a driven gear. Lost motion may occur in one of three circumstances. First, if the drive gear is stopped after some period of driving a driven gear, rotational inertia of the driven gear will cause the driven gear to continue to rotate until the leading edge of the driven gear impacts the trailing edge of the drive gear. Second, if the drive gear is reversed from a first direction to a second direction, the driven gear will continue to rotate in its first direction until contacted by the returning leading edge of the drive gear. Third, a worker loading a part may push or pull on the positioner. The first circumstance results in the driven gear continuing to rotate while the drive gear is stationary. The second circumstance results in the driven gear remaining stationary or moving in a non-preferred direction while the drive gear is in operation. The third circumstance results in movement of the table according to the actions of the worker. All of these situations are undesirable as increasing noise and error and reducing the life of the gears.

The term "work surface" may also be used to describe certain aspects of the invention. This term means, without limitation, a table (oriented horizontal or vertical), part, fixture, or another machine, any of which require a high degree of accuracy in positioning. The work surface may be held in a steady position during an industrial operation, or may be movable according to the range of motion of the positioning device. While the term "table" is used throughout this description, this is but one embodiment of the invention. A work surface may be substituted for a table in any of the described embodiments.

The zero-backlash preload gear system 20 is preferably designed for use in a positioning system for an assembly 10 consisting of a welding or other automated robot 12 and table 14.

Figure 1A:
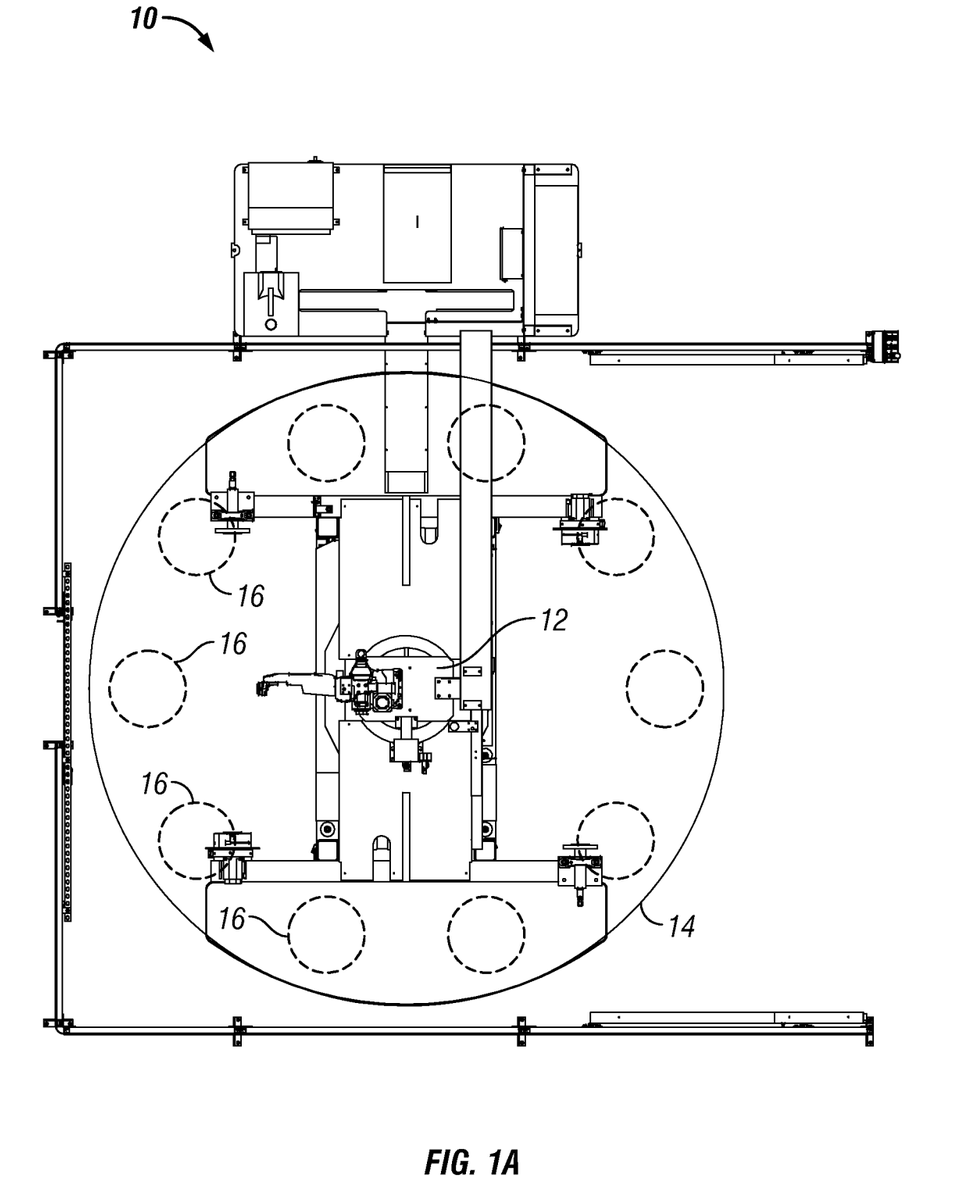
FIG. 1A is a top view of the table and robot assembly according to one embodiment of the present invention.
Figure 1B:
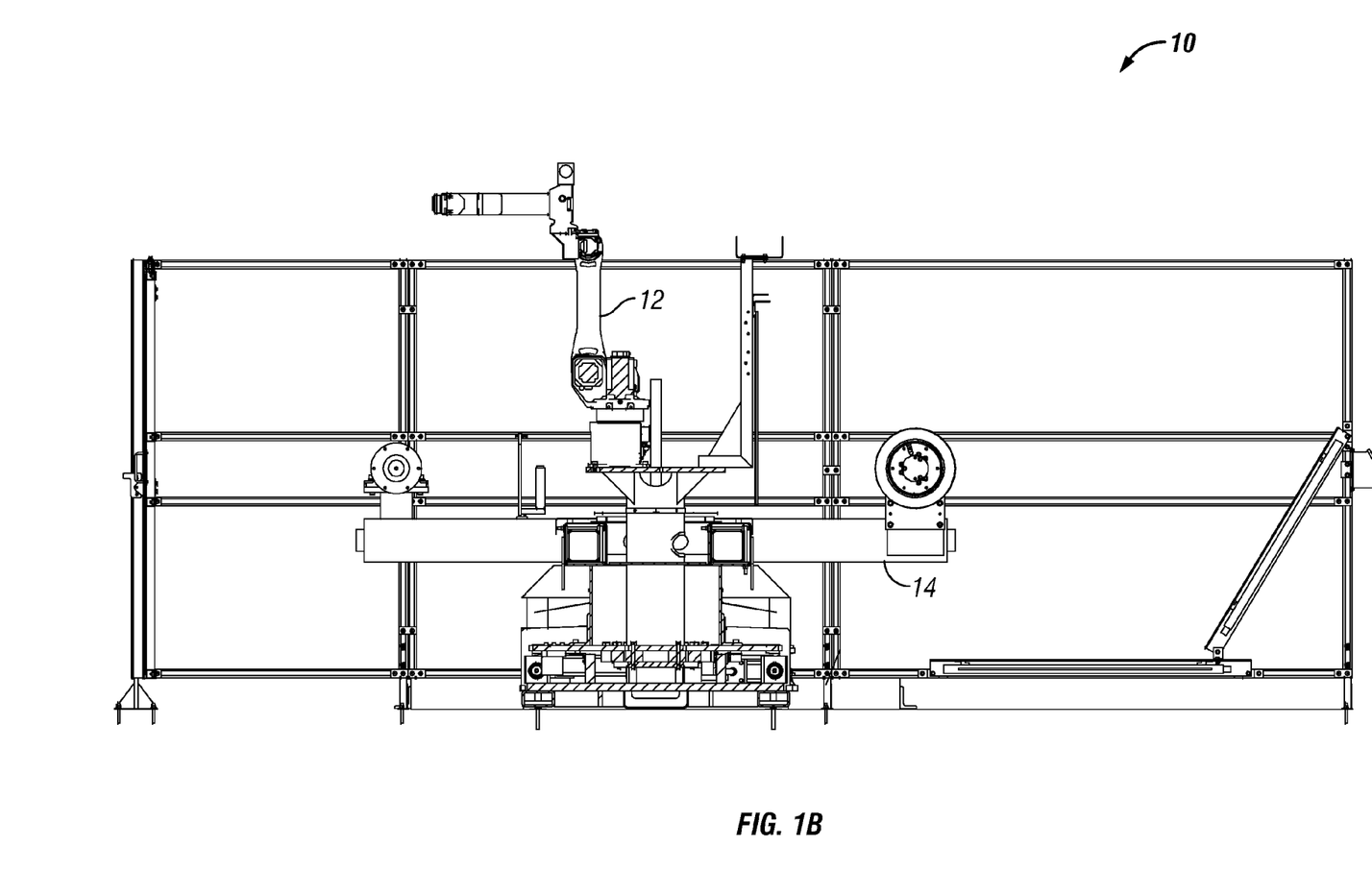
FIG. 1B is a side view of the table and robot assembly of FIG. 1A.

According to one embodiment, as illustrated in FIGS. 1A and 1B, the robot 12 is mounted to the center of the table 14. Such an arrangement reduces the required amount of floor space required for the robot to operate while increasing its usable range of operation.

As can be appreciated by those skilled in the art, an automated robot 12 is mounted on a first axis of rotation, and therefore has a circular operating reach. Prior art systems which mount a robot adjacent the work table 14 are only able to utilize a small portion of the robot's 12 operating reach where the circular reach of the robot intersects the table space. Therefore, it is preferable to combine a circular table 14 with a center-mounted robot 12 having a circular reach to maximize usefulness of the robot 12. Such a system is described with more particularity in U.S. Pat. No. 5,083,070, herein incorporated by reference in its entirety.

The '070 patent describes the invention as being used with a "rotatable index table." The present invention provides an improved rotatable index table 12 which is capable of an infinite number of indexed positions 16 while avoiding positioning errors due to backlash. Backlash is defined as the play in gears caused by tooth spaces exceeding the thickness of an engaging tooth.

Figure 2A:
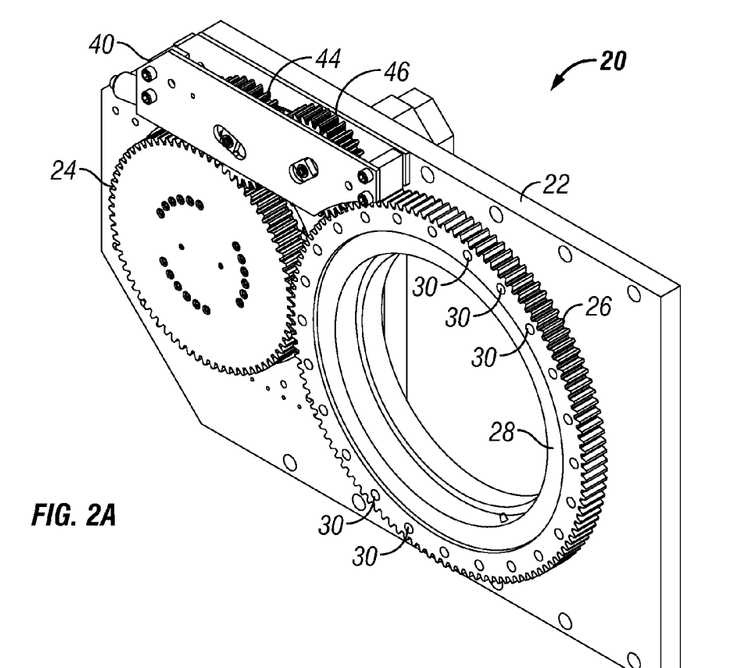
FIG. 2A is a front perspective view of the gear assembly according to one embodiment of the present invention.
Figure 2B:
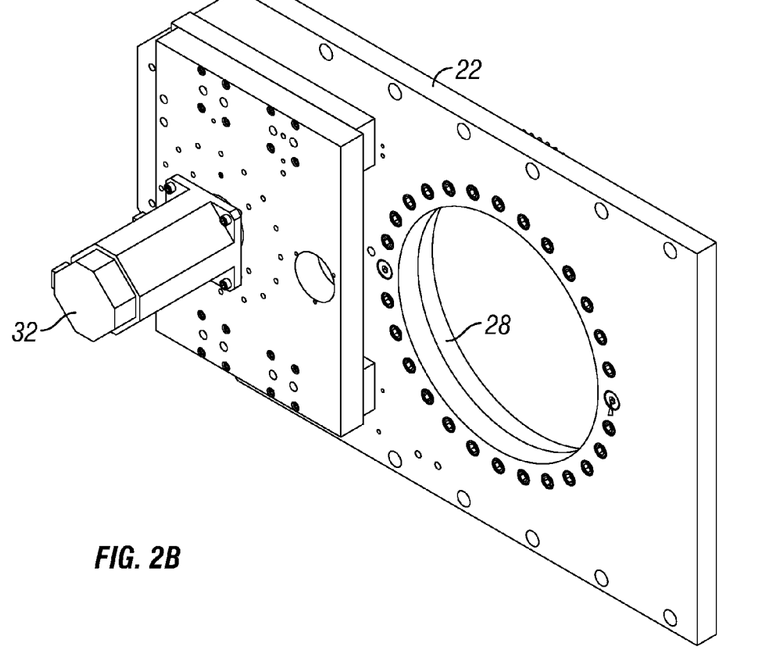
FIG. 2B is a back perspective view of the gear assembly of FIG. 2A.

The zero-backlash preload gear system 20 which drives the table 12 is shown in an assembled configuration in FIGS. 2A and 2B. FIG. 2A shows the drive gear 24 and driven gear 26 arranged according to the preferred embodiment while FIG. 2B shows the mounting system for the driven gear 26 and the servo motor 32 which provides the indexing function. The entire gear system 20 is secured to a mounting plate 22.

Servo motors are well known in the art. When a coded signal is sent to a servo motor the motor moves to a predetermined angular position. The motor holds this position so long as the signal is maintained. For example, if a 1.5 ms electrical pulse is sent to the servo every 20 ms, the servo will remain at its neutral or 90° position. A 1.75 ms pulse causes the motor to move to its 180° position while a 1.25 ms pulse would cause the motor to move to its 0° position. These examples are only used by way of illustration, as each manufacturer may provide their own operating parameters, technical specifications, and accuracy. Servo motors may also have rotational positions in excess of 360°, requiring one or more rotations of the motor in response to a received signal.

The drive gear 24 is rotated about an axle (not shown) passing through the mounting plate 22, and is secured by means commonly known in the art, such as a bearing. The driven gear 26 is shown as a hollow gear having an open center, through which power and electronics may be passed, thereby allowing the robot to be mounted through the center of the table 14. The driven gear 26 is attached to the mounting plate by, for example, a bearing 28 secured to the mounting plate 22. Positioned about the circumference of the driven gear 26 are a number of mounting holes 30 to which the tabletop 14 is securely fastened. As the driven gear 26 is rotated to a variety of positions by the drive gear 24 and servo motor 32, the rotation is transferred to the tabletop 14, cycling through the indexed positions 16.

Also attached to the mounting plate 22 is an idler assembly 40 which eliminates backlash in the system. The idler assembly 40 primarily includes an adjustment member 42, a first idler gear 44 meshing with the drive gear 24 and a second idler gear 46 meshing with the driven gear 26. The first 44 and second 46 idler gears mesh with one another. An idler plate 48 covers the idler gears 44, 46.

Figure 3:
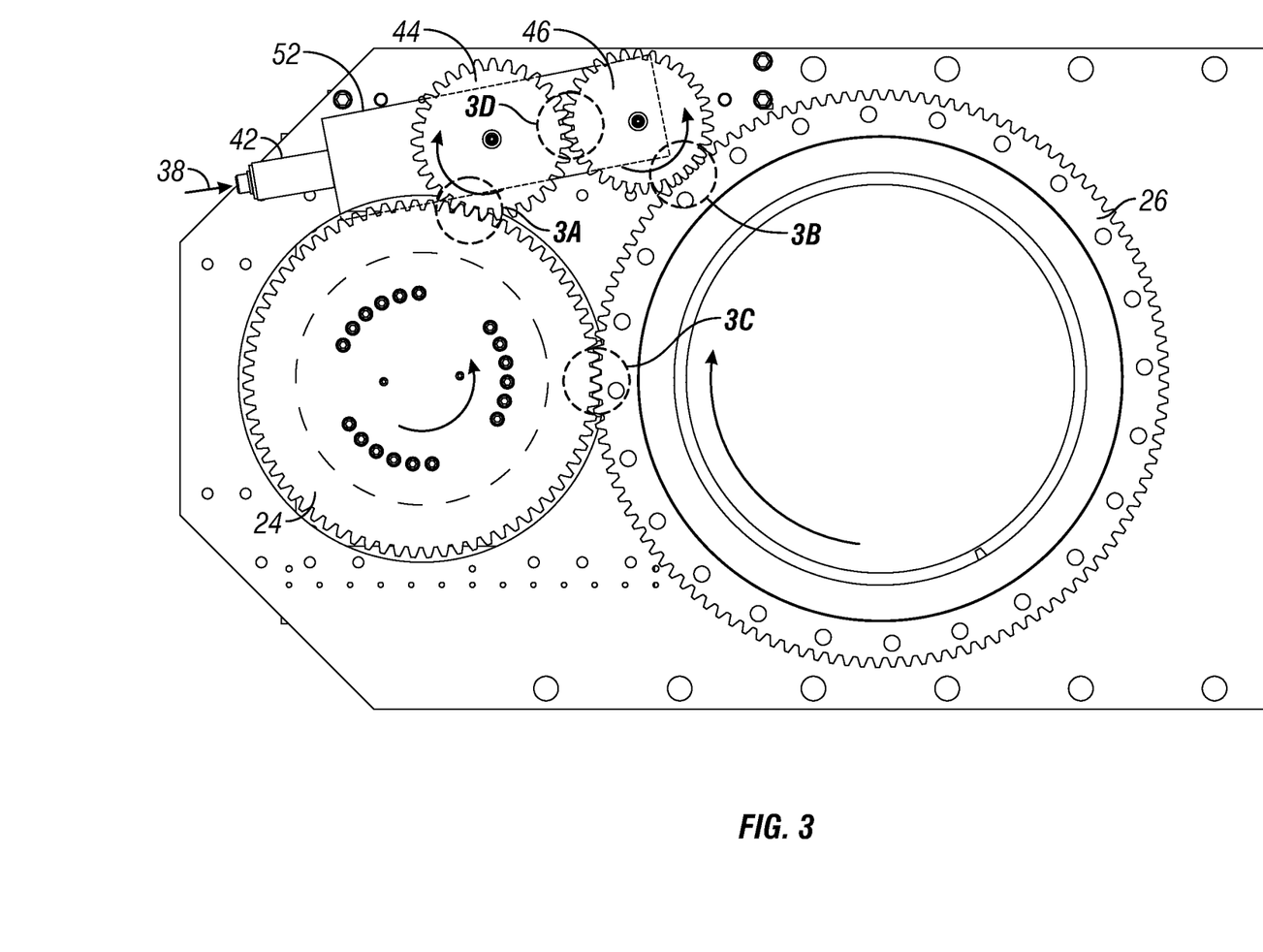
FIG. 3 is a front view of the assembly with the drive gear rotating counterclockwise.
Figure 3A:
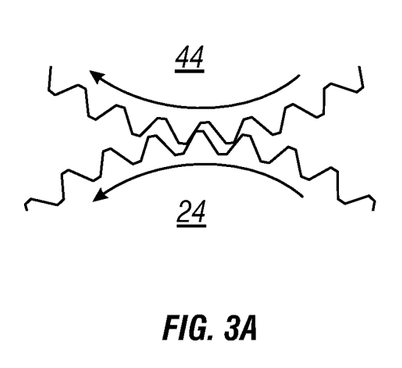
FIG. 3A is an enlarged view of the meshing teeth of the drive and first idler gears in operation according to FIG. 3.
Figure 3B:
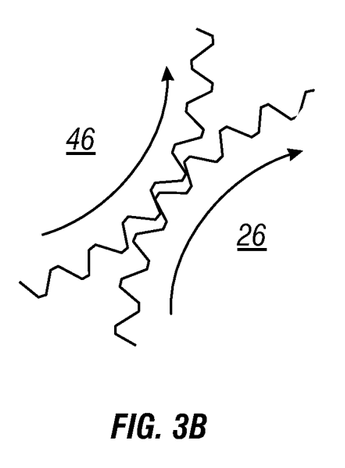
FIG. 3B is an enlarged view of the meshing teeth of the driven and second idler gears in operation according to FIG. 3.
Figure 3C:
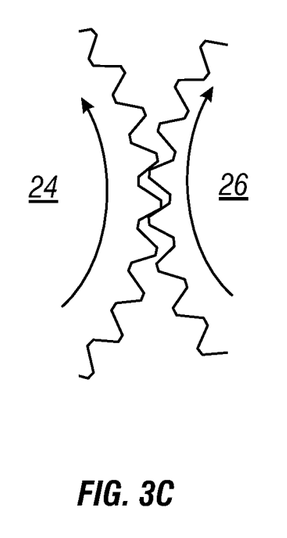
FIG. 3C is an enlarged view of the meshing teeth of the drive and driven gears in operation according to FIG. 3.
Figure 3D:
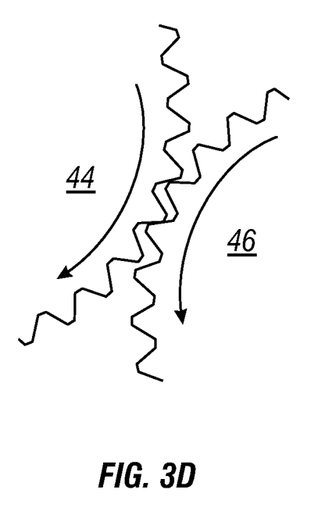
FIG. 3D is an enlarged view of the meshing teeth of the first and second idler gears in operation according to FIG. 3.
Figure 4:
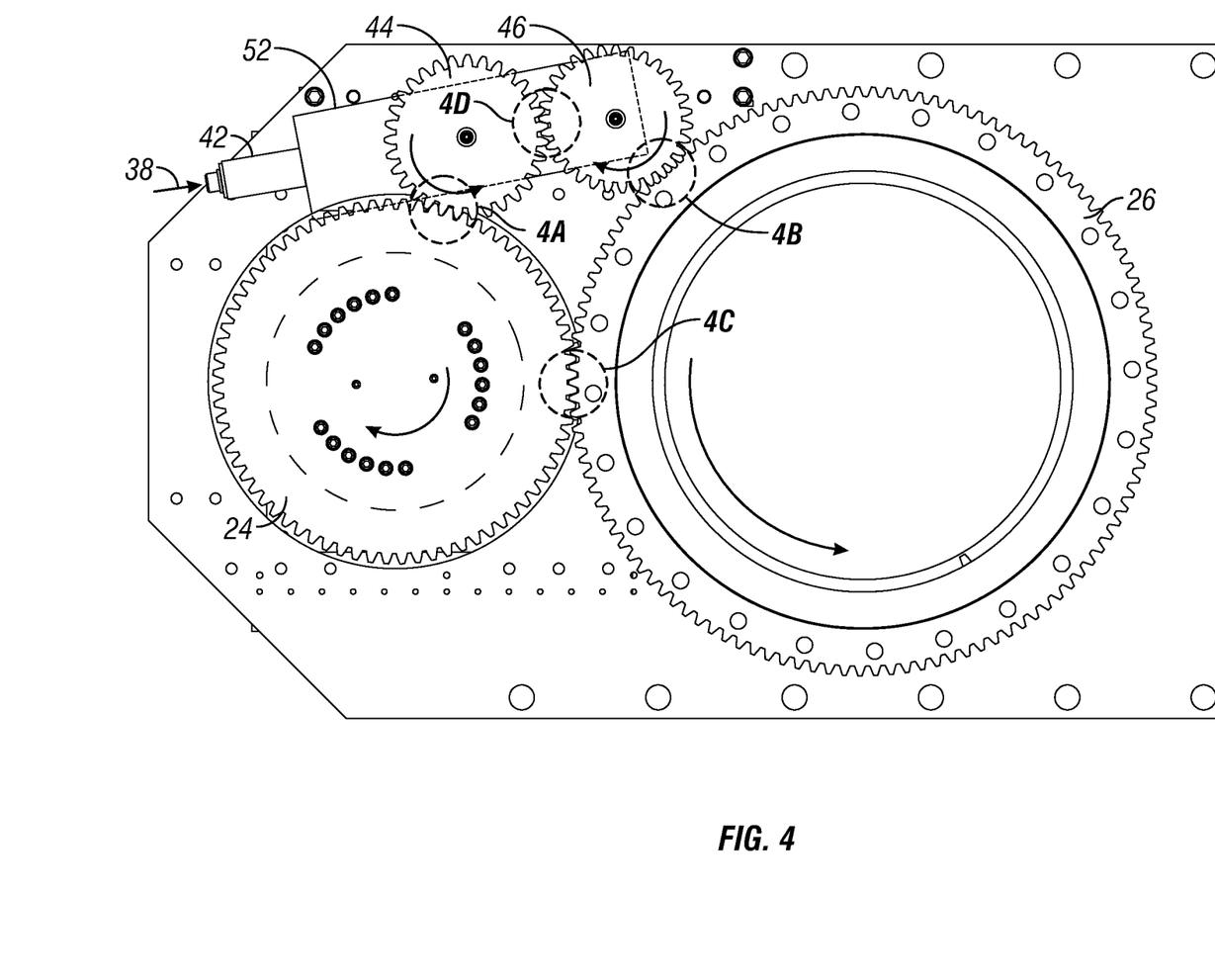
FIG. 4 is a front view of the assembly of FIG. 2A with the drive gear rotating clockwise.
Figure 4A:
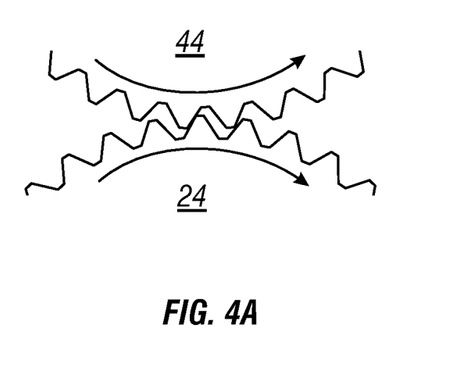
FIG. 4A is an enlarged view of the meshing teeth of the drive and first idler gears in operation according to FIG. 4.
Figure 4B:
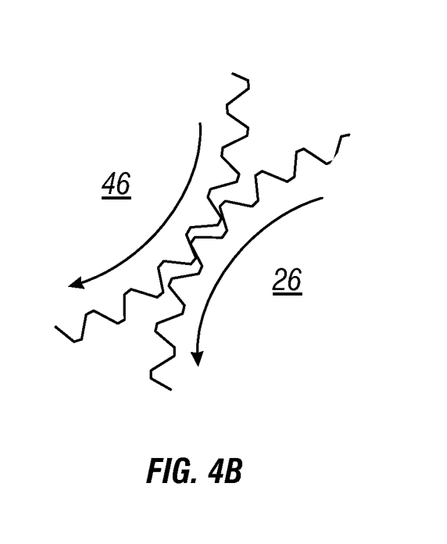
FIG. 4B is an enlarged view of the meshing teeth of the driven and second idler gears in operation according to FIG. 4.
Figure 4C:
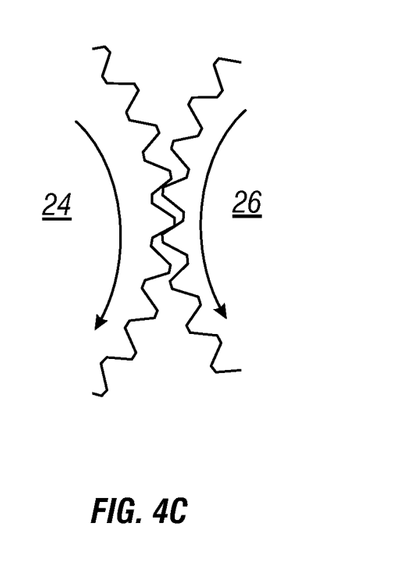
FIG. 4C is an enlarged view of the meshing teeth of the drive and driven gears in operation according to FIG. 4.
Figure 4D:
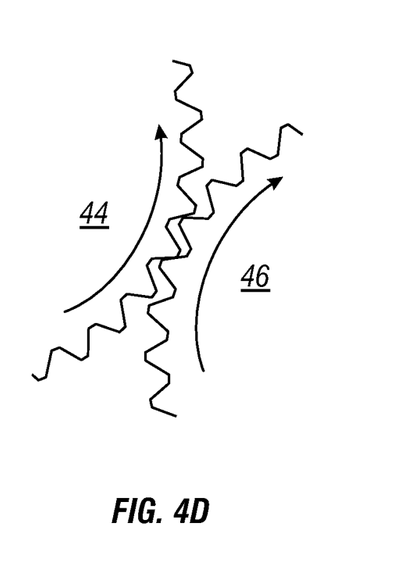
FIG. 4D is an enlarged view of the meshing teeth of the first and second idler gears in operation according to FIG. 4.

FIG. 3 shows a front view of the entire gear assembly 20 with the idler plate 48 removed so that the interaction of the gears may be demonstrated. According to the embodiment shown, a compression force 38 is applied to the adjustment member 42, thereby subtly shifting the base plate 52 direction towards the driven gear 26. This causes the idler gears 44, 46 to likewise shift and contact the drive and driven gears 24, 26. As the drive gear 24 is rotated in a counter-clockwise direction, the leading edge of the teeth of the drive gear 24 make contact with the trailing edge of the teeth of the first idler gear 44 (see FIG. 3A); while the trailing edge of the teeth of the drive gear 26 make contact with the leading edge of the teeth of the driven gear 26 (see FIG. 3C). As shown in FIGS. 3B and 3D, the leading edge of the teeth of the first idler gear 44 contact the trailing edge of the teeth of the second idler gear 46; and the leading edge of the teeth of the second idler gear 46 contact the trailing edge of the teeth of the driven gear 26.

It is to be understood by those skilled in the art that according to this embodiment, when a compression force 38 is applied to the adjustment member 42 and the drive gear 24 is rotated in a counterclockwise direction, power is transferred from the drive gear 24 through the idler gears 44, 46 to the driven gear 26.

FIGS. 4 and 4A-D show the arrangement of FIG. 3 where the drive gear 24 is rotated in a clockwise direction. As can be appreciated by those skilled in the art, when such an arrangement is used, power is transferred directly from the drive gear 24 to the driven gear 26.

Based on this arrangement, it should be understood that when the drive gear 24 is reversed in direction, with a constant force 38 on the adjustment member 42, there is no period in which a leading edge of the teeth of the drive gear 24 is not in contact with either the driven gear 26 or the first idler gear 44. Similarly, there is no period where a trailing edge of the teeth of the driven gear 26 is not in contact with either the drive gear 24 or second idler gear 46, thereby eliminating the effects of backlash in the system.

Those skilled in the art will appreciate that when a tensile force (not shown) is applied to the adjustment member 42, the above-described arrangement is reversed. When the drive gear is rotated counter-clockwise, power is transferred directly from the drive 24 to the driven gear 26. When the drive gear 24 is rotated clockwise, power is transferred through the idler gears 44, 46 to the driven gear 26.

According to the above-described arrangement, the rotational orientation of the table 14 may be adjusted in either a clockwise or counterclockwise direction without large error in the positioning of the indexed locations 16. For example, the difference between the tooth gap in one gear and the tooth thickness of another gear may be 0.005" for a gear having a pitch diameter of 20". The gear is then attached to a table having a diameter of 80", translating into 0.02" error. Therefore, it is shown that the error of a small amount of backlash in a gearing system is compounded to create larger errors in the positioning system. By eliminating or substantially reducing the error due to backlash, tighter manufacturing tolerances may be held on the worked parts.

Figure 5:
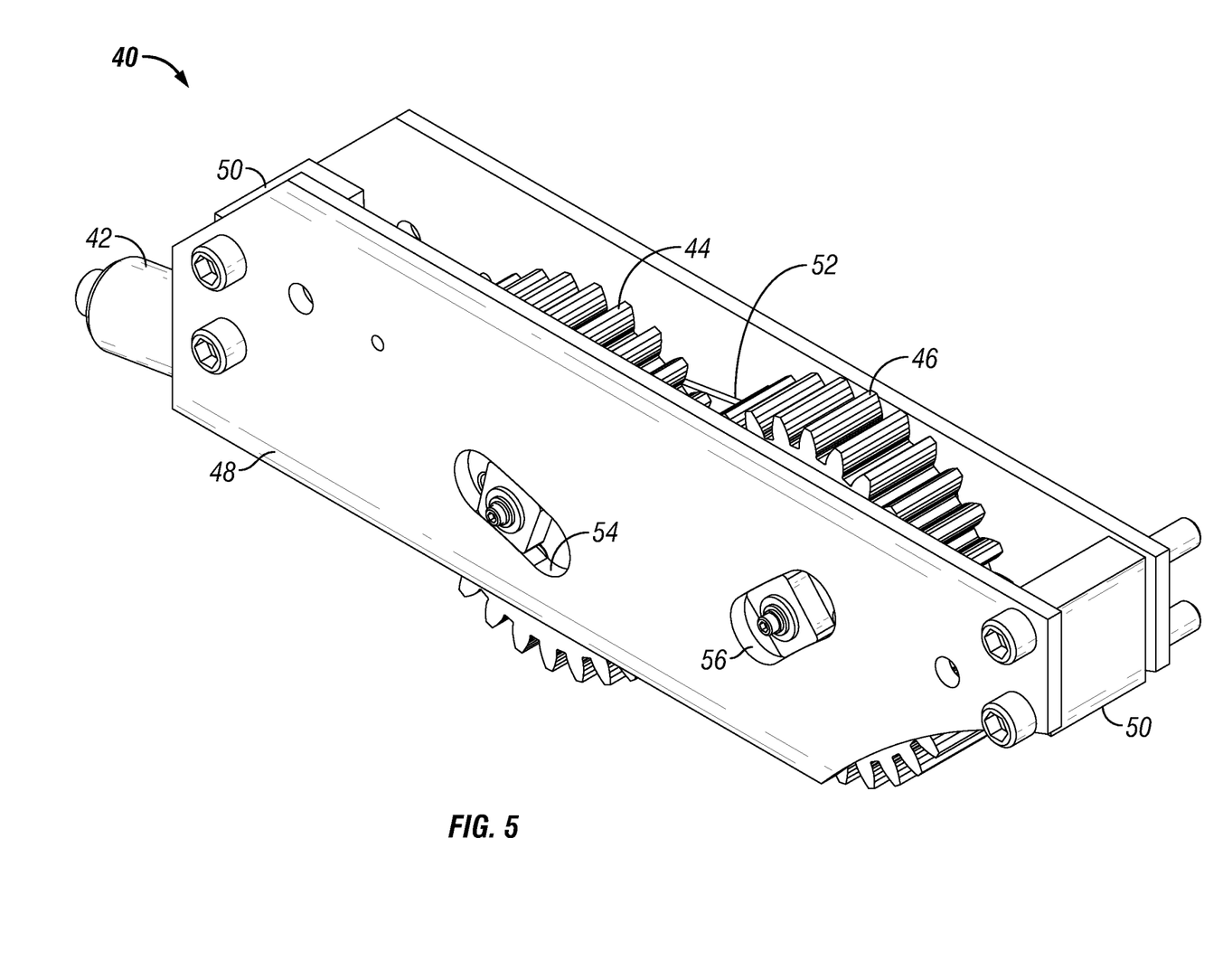
FIG. 5 is an enlarged perspective view of the idler assembly.
Figure 6:
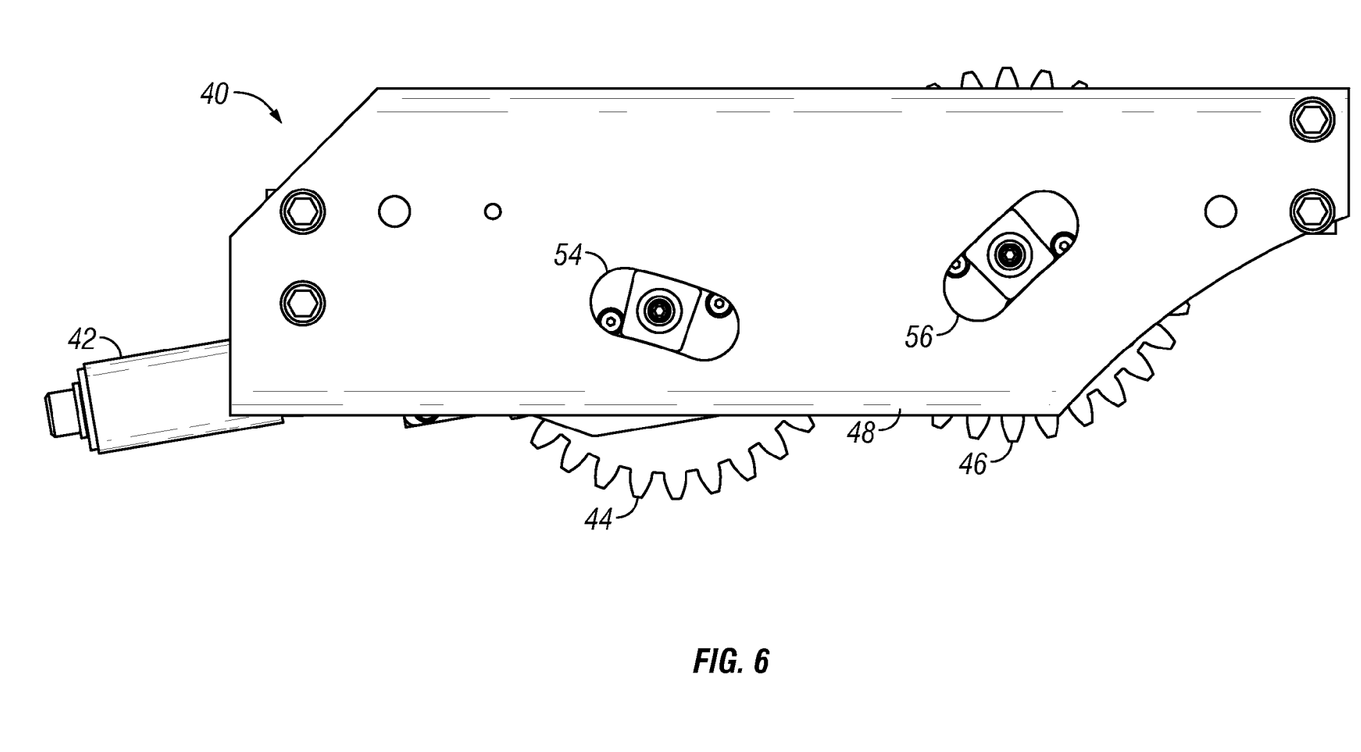
FIG. 6 is an enlarged front view of the idler assembly.

The idler assembly 40, best shown in FIG. 5, is also an important component in the operation of the positioning gear assembly 20. Generally the idler assembly 40 consists of a base plate 52, a pair of idler gears 44, 46, a pair of idler plates 48, spacers 50, and the adjustment member 42. The idler gears 44, 46 are connected at their axes by the base plate 52 so that there is a fixed distance between their respective axes ensuring constant meshing between them. The connected idler gears 44, 46 are then each constrained by slots 54, 56 in the idler plates 48 about their respective axes to move in an arc 54, 56. The first idler gear 44 is limited to movement in a first arc 54 which is centered about the axis of the drive gear 24. The second idler gear 46 is limited to movement in a second arc 56 which is centered about the axis of the driven gear 26.

This arrangement serves dual purposes. First, since the first and second idler gears 44, 46 are constrained to have a fixed distance between centers, their movement relative one another can be predicted. Therefore, the idler gears 44, 46 will not separate or jam one another. Second, by constraining the first and second idler gears 44, 46 to arcs 54, 56 centered on the drive and driven gears 24, 26, it is ensured that the idler gears 44, 46 remain in constant contact with the drive and driven gears 24, 26. This setup is important to ensure constant meshing of teeth between adjacent gears even as wear of the teeth occurs.

The adjustment member 42 is connected to base plate 52 to transmit the necessary force to ensure contact between the teeth of the idler gears 44, 46 and the drive and driven gears 24, 26. Even when the drive 44 and driven 46 gears are new, variations in manufacturing will result in some amount of backlash between the gears. The adjustment member 42 transfers a force 38, either compressive or tensile, onto the base plate 52 and thereby to the idler gears 44, 46.

When a force 38 is applied to the adjustment member 42, the first idler gear 44 is forced into contact with either the leading or trailing edge of the drive gear 24 (depending on whether the force is tensile or compressive and whether the drive gear is operated in a clockwise or counterclockwise direction). Once contact is made, the first idler gear 44 is rotated slightly to contact the teeth of the second idler gear 46. This causes the second idler gear 46 to be slightly rotated as well, until it contacts the teeth of the driven gear 26, which also rotates to contact the drive gear 24. At this point, all gears are in contact with at least two other gears, and whichever direction the drive gear 24 is rotated the leading edge of at least one tooth will be in contact with either the first idler gear 44 or the driven gear 24. Providing a larger-than-necessary force 38 to the adjustment member 42 allows the system to self-correct during operation of the gear system 20.

The adjustment member 42 may take one of several forms. For example, and without limitation, the adjustment member 42 may comprise a spring assembly, the spring may be either a tension or compression spring, providing a constant force against the idler base plate 52. Alternatively, the adjustment member 42 may be a screw, acting against the idler assembly 40 and an external wall. The screw may be accessible without disassembling the gear assembly 20 or positioning assembly 10, thereby allowing for compensation without excessive downtime. The system may also comprise a piston, magnet, biasing member, applied load, or any other structure commonly known to those in the art which is capable of providing a linear force.

The above description is illustrative of one embodiment of the invention. Other options and alternatives may be used.

While the gears shown in the attached figures are circular gears, it can be appreciated that the invention would also work with other types of gears, such as a rack and pinion, elliptical gears, incomplete gears, gears having a varying radius, linear gears, and generally any gear combination where backlash is present and sought to be reduced.

Additionally, the driven gear 26 has been shown and described as a hollow gear. It should be apparent that the hollow gear is shown according to one preferred embodiment, and the invention is not limited to the driven gear 26 being hollow. A solid gear is within the scope of the invention.

Additionally, the idler gears are described as moving along an arc centered at the drive and driven gears. In practicing the invention, it may be found that the amount of movement of the idler gears is minimal, and therefore little benefit is achieved by moving the idler gears in an arc. It may be preferable to allow the idler gears to move along a line, thereby reducing expense in producing the parts while maintaining a similar tolerance for adjustment of the idler gears.

Additionally, the system described may be used in series with other such systems. A gear train, either stacked or arranged linearly, may be positioned with an idler gear assembly between any two adjacent gears. This arrangement would reduce error compounded through the gear train.

While the device described above has been generally identified as providing positions of infinitely variability, those skilled in the art will appreciate that the limitations of servo motors impose practical limitations on the actual number and location of positions on the table. Additionally, practical mechanical and tolerance restrictions impose additional limitations on the number of actual positions which may be utilized. However, it should be understood to those in the art that the above described gear system is capable of such infinite variability absent these external limitations.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A gear set comprising:
   a first idler gear having a first axis and first teeth at an outer edge thereof;
   a second idler gear having a second axis and second teeth at an outer edge thereof;
   a drive gear having a drive axis and drive teeth at an outer edge thereof;
   a driven gear having a drive axis and driven teeth at an outer edge thereof;
   the first teeth of the first idler gear meshing with the drive teeth of the drive gear;
   the second teeth of the second idler gear meshing with the first teeth of the first idler gear;
   the driven teeth of the driven gear meshing with both the second teeth of the second idler gear and the drive teeth of the drive gear;
   the first and second axes of the first and second idler gears respectively movable between a first position wherein the engagement of drive teeth and the driven teeth have lost motion with respect to one another to a second position wherein the drive teeth and the driven teeth have reduced lost motion from the first position with respect to one another;
   wherein the idler gears are held in the second position by an adjustment member;
   wherein the first axis and the second axis are at a fixed distance from each other; and
   wherein the first axis is restricted to movement about an arc centered on the drive gear and the second axis is restricted to movement about an arc centered on the driven gear.

2. The gear set according to claim 1 wherein a base is attached to both the driven gear and the drive gear, the adjustment member being attached to both the base and the first and second idler gears.

3. The gear set according to claim 1 wherein a gear box houses the first idler gear and the second idler gear.

4. A method for driving a drive gear having drive gear teeth at an outer peripheral edge thereof, a driven gear having driven gear teeth at an outer peripheral edge thereof; the drive teeth engaging the driven teeth and having a lost motion with respect thereto; the method comprising:
   taking a first idler gear having a first axis and first teeth at an outer edge thereof, a second idler gear having a second axis and second teeth at an outer edge thereof, a drive gear having drive teeth at an outer edge thereof, a driven gear having a driven teeth at an outer edge thereof;
   meshing the first teeth of the first idler gear with both the second teeth of the second idler gear and the drive teeth of the drive gear;
   meshing the second teeth of the second idler gear with the driven teeth of the driven gear;
   moving the first and second teeth of the first idler gear and the second idler gear respectively between a first position wherein the meshing of the drive teeth and the driven teeth experience a lost motion with respect thereto and a second position wherein the meshing of the drive teeth and the driven teeth experience a reduced lost motion from the lost motion position;
   adjusting the first and second idler gears with respect to the drive gear and the driven gear while maintaining a first axis of the first idler gear and a second axis of the second idler gear so that the first axis and the second axis remain at a fixed distance from one another, and such that the first axis moves about an arc centered on the drive gear and the second axis moves about an arc centered on the driven gear.

5. A gear set comprising:
   a base plate;
   a first idler gear mounted to the base plate having a first axis and first teeth at an outer edge thereof;
   a second idler gear mounted to the base plate having a second axis at a fixed distance from the first axis and second teeth at an outer edge thereof;
   a drive gear having drive teeth at an outer edge thereof;
   a driven gear having a driven teeth at an outer edge thereof;
   the first teeth of the first idler gear meshing with the drive teeth of the drive gear;
   the second teeth of the second idler gear meshing with first teeth of the first idler gear;
   the driven teeth of the driven gear meshing with both of the second teeth of the second idler gear and the drive teeth of the drive gear;
   the first and second axes of the first and second idler gears respectively movable between a first position wherein the meshing of drive teeth and the driven teeth have lost motion with respect to one another to a second position wherein the drive teeth and the driven teeth have reduced lost motion from the first position with respect to one another;
   wherein the first axis is restricted to movement about an arc centered on the drive gear and the second axis is restricted to movement about an arc centered on the driven gear.

6. A positionable indexing system comprising:
   a positioning assembly comprising:
      a mounting plate;
      a drive gear attached to the mounting plate so as to freely rotate about a drive axis, the drive gear having drive teeth;
      a driven gear attached to the mounting plate so as to freely rotate about a driven axis, the driven gear having driven teeth the driven teeth meshing with the drive teeth;
   an idler assembly comprising:
      a first idler gear mounted on a base plate having a first axis, the first idler gear having first idler teeth meshing with the drive teeth;
      a second idler gear mounted on the base plate having a second axis, the second idler gear having second idler teeth meshing with both the first idler teeth and the driven teeth;
   a work surface having at least one indexing position, the work surface fastened to the driven gear;
   a servo motor in communication with the drive gear, the servo configured to deliver at least one specific rotational input into the positioning system to position the work surface at one of the at least one indexing positions;
   whereby the idler assembly interacts with the positioning assembly to eliminate lost motion between the drive gear and driven gear;
   wherein the first and second idler axes are at a fixed distance relative one another;
   wherein the first idler axis is restricted to movement about an arc centered at the drive axis; and
   wherein the second idler axis is restricted to movement about an arc centered at the driven axis.

7. The positionable indexing system of claim 6 wherein the idler assembly further comprises an adjustment member, the adjustment member providing force onto the idler assembly so as to maintain the reduced lost motion.

8. The positionable indexing system of claim 7 wherein the adjustment member receives a tensile force.

9. The positionable indexing system of claim 7 wherein the adjustment member receives a compression force.

10. The positionable indexing system of claim 6 wherein the driven gear is a hollow gear.

\* \* \* \* \*